(12) United States Patent
Walterscheid et al.

(10) Patent No.: US 7,955,167 B2
(45) Date of Patent: Jun. 7, 2011

(54) MODULAR AUTOMOTIVE HVAC CONTROL HEAD

(75) Inventors: Wade J. Walterscheid, Rosston, TX (US); Terry D. Manuel, The Colony, TX (US); Christopher G. Wehrwein, Little Elm, TX (US)

(73) Assignee: PACCAR Inc, Bellevue, WA (US)

( * ) Notice: Subject to any disclaimer, the term of this patent is extended or adjusted under 35 U.S.C. 154(b) by 1173 days.

(21) Appl. No.: 11/549,442

(22) Filed: Oct. 13, 2006

(65) Prior Publication Data

US 2007/0149104 A1 Jun. 28, 2007

Related U.S. Application Data

(60) Provisional application No. 60/726,412, filed on Oct. 13, 2005.

(51) Int. Cl.
*B60S 1/54* (2006.01)

(52) U.S. Cl. ........ 454/121; 248/27.1; 248/27.3; 296/70; 454/69

(58) Field of Classification Search .............. 454/69, 454/121, 127, 156; 165/41, 42; 248/27.1, 248/27.3; 296/70
See application file for complete search history.

(56) References Cited

U.S. PATENT DOCUMENTS

| | | | |
|---|---|---|---|
| 4,913,384 A * | 4/1990 | Inamura | 248/27.3 |
| 5,685,598 A | 11/1997 | Inoue et al. | 296/194 |
| 5,823,602 A | 10/1998 | Kelman et al. | 296/70 |
| 5,861,589 A * | 1/1999 | Sato et al. | 200/5 R |
| 5,883,777 A | 3/1999 | Nishitani et al. | 361/647 |
| 6,158,802 A * | 12/2000 | Akagi et al. | 296/214 |
| 6,176,534 B1 | 1/2001 | Duncan | 296/37.12 |
| 6,234,569 B1 | 5/2001 | Derleth et al. | 296/208 |
| 6,388,881 B2 | 5/2002 | Yamauchi et al. | 361/704 |
| 6,488,330 B2 | 12/2002 | Hedderly | 296/192 |
| 6,502,888 B2 | 1/2003 | Inoue et al. | 296/72 |
| 6,517,145 B2 | 2/2003 | Hedderly | 296/192 |
| 6,686,911 B1 * | 2/2004 | Levin et al. | 345/184 |
| 6,709,041 B1 | 3/2004 | Hotary et al. | 296/70 |
| 6,854,783 B2 | 2/2005 | Teranishi et al. | 296/70 |
| 2005/0044873 A1 * | 3/2005 | Tamai et al. | 62/323.1 |

* cited by examiner

*Primary Examiner* — Gregory A. Wilson
*Assistant Examiner* — Seth Greenia
(74) *Attorney, Agent, or Firm* — Christensen O'Connor Johnson Kindness PLLC

(57) ABSTRACT

A modular, quick-install HVAC control head is provided. The control head includes a face plate and housing on which various HVAC controls may be mounted. The face plate and housing clip together to form the assembled control head. The assembled control head fits into an instrument panel opening having a standard size. Clips on the HVAC trap a part of the instrument panel between the clip and a flange on the face plate to secure the HVAC control head in the instrument panel.

16 Claims, 3 Drawing Sheets

MODULAR AUTOMOTIVE HVAC CONTROL HEAD

Priority is claimed to U.S. Provisional Application No. 60/726,412, filed Oct. 13, 2005, which is incorporated herein in its entirety by this reference.

The present invention relates in general to an improved dash-mounted control unit for automotive heating, ventilation, and air conditioning (HVAC) systems.

BACKGROUND OF THE INVENTION

In some motor vehicles such as semi trucks, instrument panels are highly customizable. By varying the size, shape, type, number, and layout of the instruments, indicators, and controls in the instrument panel a purchaser can customize the instrument panel to their needs and desires. However, the ability to customize the instrument panel to such a high degree while maintaining a high quality fit and finish increases the cost of manufacturing the instrument panel. This is particularly true when items installed in the instrument panel, such as the various controls, gauges, and indicators have different shapes and/or sizes. It would therefore be desirable to provide methods and apparatus for efficiently providing customized instrument panels at reasonable cost, while maintaining a high quality fit and finish.

Moreover, it may be convenient to be able to operate some vehicle systems from more than one location. For example, in the sleeper compartment of a semi truck it can be inconvenient to use dashboard mounted HVAC controls to adjust cabin temperature or fan speed. Controls mounted in the sleeper compartment would be more convenient. To reduce costs, it would be desirable to use the same controls as are used in the instrument panel mounted controls. Because some controls in an instrument panel mounted HVAC control head would not make sense for an HVAC control head in the sleeper compartment, it would be desirable to provide a modular system in which unused controls may be replaced with alternative controls or functions.

SUMMARY OF THE INVENTION

The objects and advantages of the present invention are provided by a modular, quick-install, self-contained, HVAC control head having a standard size and shape. Specifically, the HVAC control head conforms to the size of a dashboard opening commonly used for automotive audio units such as radios, CD players and the like. Other devices may also be made DIN-slot compatible to further enhance the ability to customize the instrument panel.

BRIEF DESCRIPTION OF THE DRAWINGS

These and other objects and advantages of the present invention will be understood upon consideration of the detailed description taken in conjunction with the accompanying drawings, in which like reference characters refer to like parts, and in which.

DETAILED DESCRIPTION

An HVAC control head in accordance with the principles of the present invention is designed so that it has standard dimensions. Specifically, the HVAC control head is designed to fit a standardized instrument panel opening typically used for audio devices, such as radios or CD-player. The Deutsches Institut für Normung e. V. (DIN), established a standard size dash board opening for automotive audio equipment such as car radios, CD-players, and the like, of about 183 mm by 53 mm. These openings are sometimes referred to as DIN slots. By making an HVAC control head that fits in a DIN slot, the location of the HVAC control head in an instrument panel may be easily changed by swapping the HVAC control head with another DIN slot device. Moreover, because the size of a DIN slot is standardized, the DIN slot may be machined in a different location of an instrument panel with relative ease.

Figure 1:
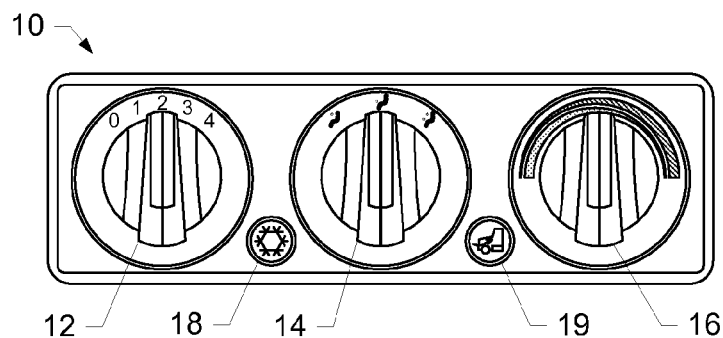
FIG. 1 is a front view of an illustrative HVAC control head in accordance with the principles of the present invention.

FIG. 1 shows a front view of illustrative HVAC control head 10. HVAC control head 10 typically includes a number of switches, knobs, and buttons for controlling the operation of a vehicles HVAC system. For example, control 12 is used to select a fan speed; control 14 is used to select between different HVAC system operating modes such as heating, cooling, defrosting, and the like; and control 16 is used to set a temperature. HVAC control head 10 may also include buttons, such as button 18, for turning an air conditioner on and off, and button 19, for fresh air venting. Illustrative HVAC control head 10 shown in FIGS. 1-6 has rotary-style controls in a side-by-side arrangement. One skilled in the art will understand that other types and styles of controls may be used. For example, an HVAC control head may use slider-style or push button-style controls.

Figure 2:
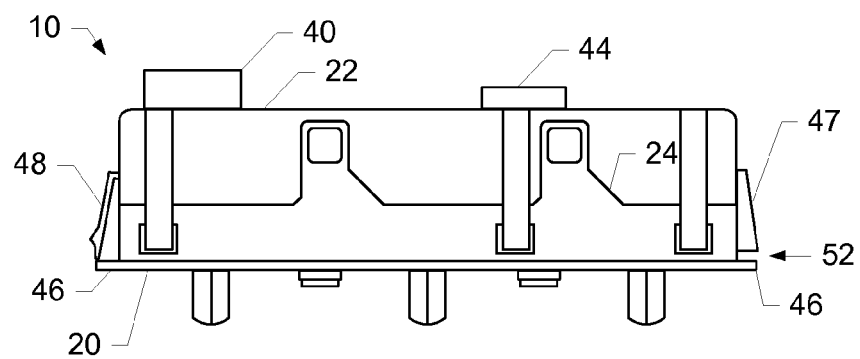
FIG. 2 is a top view of the HVAC control head of FIG. 1.
Figure 6:
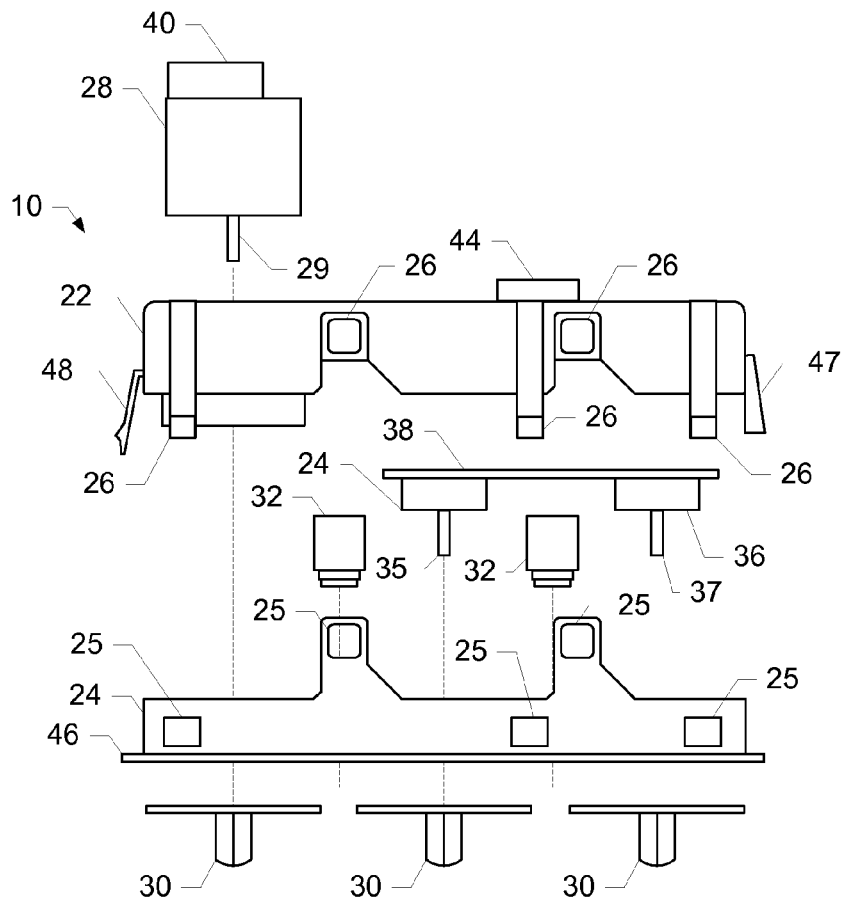
FIG. 6 is an exploded view of the HVAC control head of FIG. 1.

Referring now to FIGS. 2 and 6, illustrative HVAC control head 10 is composed of multiple parts, including face plate 20 and housing 22, which snap together to form a unit for holding the HVAC controls. Face plate 20 and housing 22 may be made of any suitable material, such as polycarbonate, ABS, or other plastic. Metal may also be used. Face plate 20 includes skirt 24 having openings 25. Resilient clips 26 extend from housing 22 and have teeth, pawls, or the like for latching and engaging openings 25 in skirt 24. Engagement between openings 25 and clips 26 hold face plate 20 and housing 22 together.

Circuitry and devices for HVAC control head 10 are contained in or mounted to housing 22. Some controls, such as multiple pole, rotary switch 28, are mounted in a recess in the back of housing 22. Other controls, such as push buttons 32 may be mounted to face plate 20. Still other controls, such as switch 34 or potentiometer 36 may be mounted to circuit board 38 which is then installed inside housing 22. Preferably, the various controls are attached to face plate 20 and/or housing 22 by means of resilient latches or other devices so that they snap in without the use of tools. However, screws, bolts, adhesives, welding, and other suitable techniques may be used instead. When face plate 20 and housing 22 are assembled, shafts 29, 35, and 37 of switch 28, switch 34, and potentiometer 36, respectively, project through holes in face plate 20. Knobs 30 are then attached to the shafts.

In a first embodiment of HVAC control head 10, circuit board 38 includes a controller, such as a microprocessor, for controlling the vehicle HVAC system. Such a controller is programmed to read or sense the controls in HVAC control head 10 as well as environmental conditions and to provide control signals to the vehicle HVAC system based on the controls and conditions. The control signals may be either analog, such as a switched voltage, or digital signals, such as CAN-bus signals, or the like.

Preferably, the controller is programmed to automatically take advantage of optional sensors that are connected to the control head. For example, when an optional temperature sensor is connected to the control head, the controller may operate the HVAC system in a mode that tries to maintain the vehicle cabin at a specific temperature. In an alternative embodiment, HVAC control head 10 merely holds and supports the controls mounted therein, and the controls are read by a controller located elsewhere in the vehicle.

Figure 3:
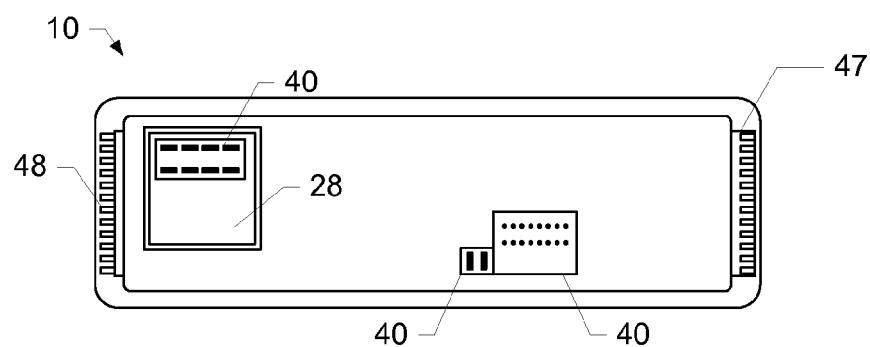
FIG. 3 is a rear view of the HVAC control head of FIG. 1.
Figure 4:
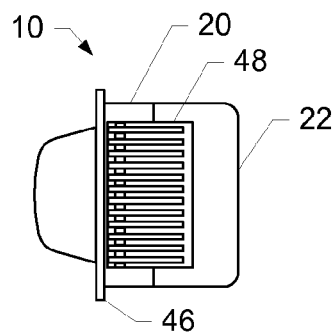
FIGS. 4 and 5 are side views of the HVAC control head of FIG. 1.
Figure 5:
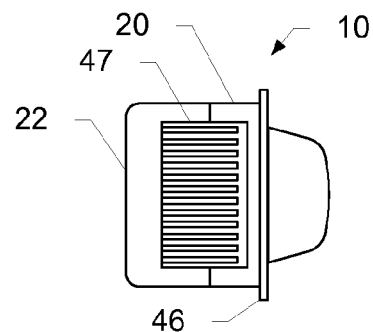

As shown in FIG. 3, plugs, sockets, or other connectors are disposed on the rear of the control unit for establishing electrical connections between HVAC control head 10 and other automotive systems and devices, such as fans, blowers, A/C clutches, indicator lights, relays, or other devices. The electrical connectors are provided on the back of HVAC control head 10 for connecting the controls therein to the vehicle's wiring harness. For example, rotary switch 28 is shown mounted in a recess in the back of housing 22 such that electrical connector 40 is exposed. Connector 40 accepts a corresponding plug in the vehicle wiring harness to provide electrical power to rotary switch 28 and to direct power from rotary switch 28 to an HVAC blower motor. Connectors 42 and 44 connect to circuitry on circuit board 38 and accept corresponding plugs for connecting push buttons 32, switch 34, and/or potentiometer 36 to vehicle systems that control the HVAC system. One of skill in the art will appreciate that connectors other than those shown in FIG. 3 may be used.

Figure 7A:
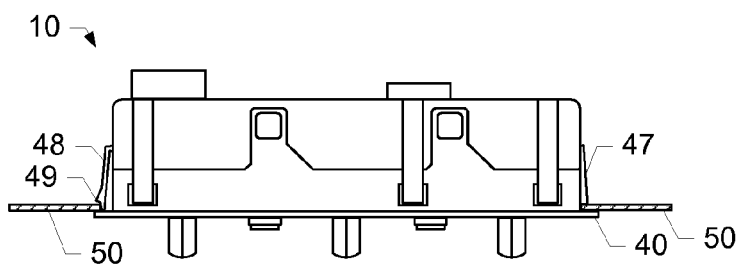
FIGS. 7A and 7B are a top view showing the installation/removal of the HVAC control head of FIG. 1 from an instrument panel.

Preferably, the HVAC control head uses a fastener-free mounting system that provides for quick, tool-less installation and removal of the HVAC control head from the front of the instrument panel. As shown in FIGS. 2, 6, and 7 face plate 20 includes flange 46, which is slightly larger than a DIN slot opening. This provides a neat appearance when HVAC control head 10 is inserted into an instrument panel. Solid clip 47 is provided at one end of housing 22, so that it projects toward face plate 20 and creates slot or groove 52 between solid clip 47 and flange 46 when face plate 20 and housing 22 are assembled. Resilient clip 48 is provided on the opposite end of housing 22 so that it projects toward face plate 20 of HVAC control head 10. Resilient clip 48 is compressed inward toward the side of HVAC control head 10 as it is inserted into a DIN slot from the front of an instrument panel. When HVAC control head 10 is fully inserted into the instrument panel, resilient clip 46 pushes HVAC control head 10 to the side causing a portion of intrument panel 50 near the edge of the DIN slot opening to be trapped in slot 52. Teeth or pawls 49 on resilient clip 48 trap a portion of instrument panel 50 surrounding DIN slot between resilient clip 48 and flange 46, thereby holding HVAC control head 10 in place. This is shown in FIG. 7A, wherein instrument panel 50 is trapped between flange 46 and solid clip 47 or resilient clip 48. Preferably, resilient clips 48 are a portion of housing 22, and are integrally formed of molded plastic with housing 22. Alternatively, the clips may be metal or other material, and may be formed separately from housing 22.

Figure 7B:
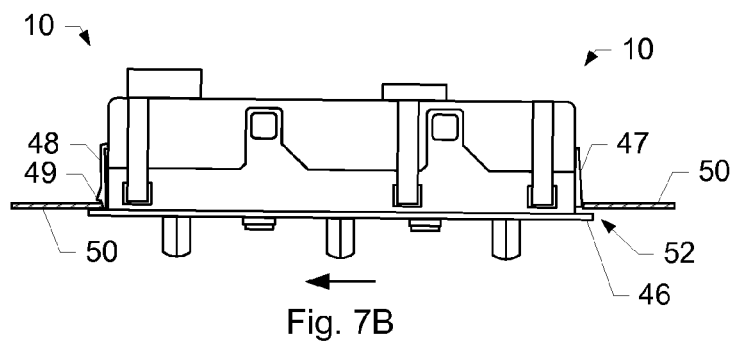

Advantageously, the construction of HVAC control head 10 enables it to be easily removed from instrument panel 50 for servicing. To remove HVAC control head 10, it is pushed or slid toward resilient clip 48. In FIGS. 7A and 7B, this corresponds to sliding HVAC control head 10 to the left. As resilient clip 48 is compressed against the skirt 24, instrument panel 50 is freed from slot 52 between solid clip 47 and flange 46. As shown in FIG. 7B, HVAC control head 10 may then be removed from the instrument panel.

As stated above, the control head of FIGS. 1-7 may also be used in other locations within a motor vehicle, such as in the sleeper compartment of a semi-truck. In such a location, some of the controls shown in FIG. 1 are not useful. For example, in the sleeper compartment it does not make sense to be able to select a defrost operating mode. In accordance with the principles of the present invention, HVAC control head 10 is modular so that unused or unneeded controls may be removed and/or replaced with other controls of features.

Figure 8:
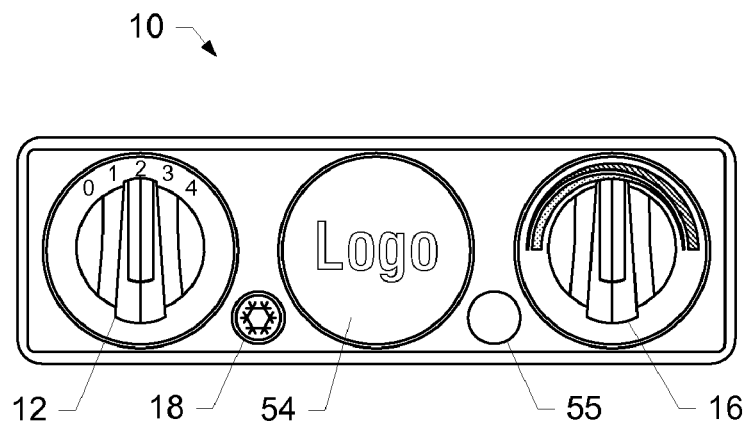
FIGS. 8-10 are front views of alternative configurations of the illustrative HVAC control head of FIG. 1 in accordance with the principles of the present invention.
Figure 9:
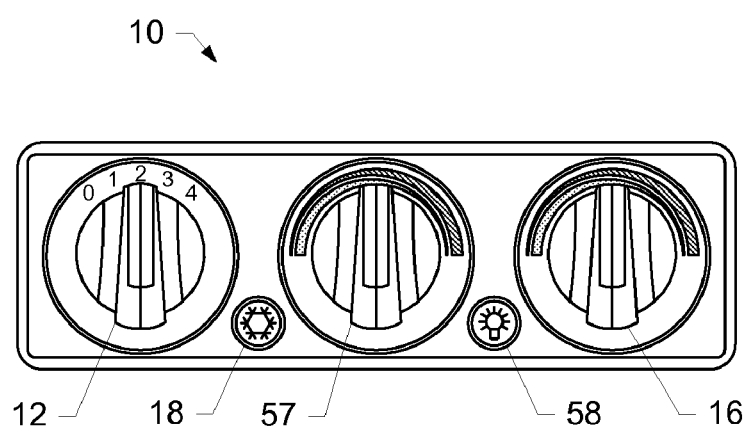
Figure 10:
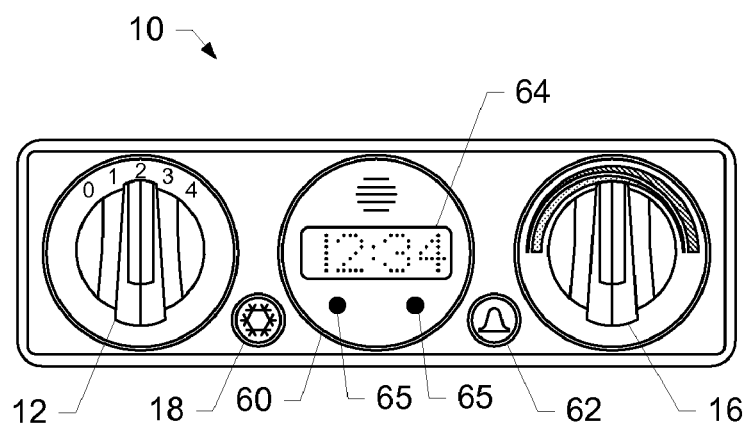

Several illustrative embodiments of alternative configurations of HVAC control head 10 are shown in FIGS. 8-10. In the embodiment of FIG. 8, operating mode control switch 14 and button 19 of FIG. 1 are removed and replaced with blank plates 54 and 55. If desired, art work such as a company logo may be shown on blank plate 54. The circuitry corresponding to operating mode control switch 14 and button 19 may be omitted from circuit board 38. Preferably, the controller on circuit board 38 is reprogrammed to function without the missing circuitry. One skilled in the art will understand that it may be less expensive to keep the unused circuitry and simply reprogram the controller to ignore the unused controls.

Some vehicles have multiple HVAC units. For example, a semi truck may have an air conditioning unit that is driven by the vehicle engine when the engine is running, and another air conditioning unit that may be used when the engine is turned off. HVAC control head 10 of FIG. 9 is modified by replacing operating mode control switch 14 with temperature control 57. Temperature control 16 may then be used to set a desired temperature when using the engine driven air conditioning system, while temperature control 57 is used to control the engine-off air-conditioning system. Instead of replacing button 19 with a blank plate as shown in FIG. 8, the button may be given a different function. For example, in HVAC control head 10 of FIG. 9 button 19 is replaced with switch 58 for turning on a cabin light, such as a reading light.

Yet another embodiment of HVAC control head 10 is shown in FIG. 10, wherein operating mode switch 14 is replaced with alarm clock 60. Alarm clock 60 may be implemented by a self contained module that snaps into face plate 20. Alternatively, a module containing drive display 64 and button 65 is snapped into face plate 20 and the controller on circuit board 38 is programmed to read buttons 65 and drive display 64 so as to implement a clock. Switch 62 may be used to turn an alarm on/off, or to implement a sleep function as commonly found on an alarm clock. Although a digital clock is shown in FIG. 10, an analog clock may also be used.

The various embodiments of HVAC control head 10 shown in FIGS. 1, 8, 9, and 10 are illustrative of the various configurations that can be implemented. Other combinations of controls, displays, and the like may be used. Combined with suitable programming in the controller on circuit board 38, many features and functions may be provided by modular HVAC control head 10, in accordance with the principles of the present invention.

Thus, an HVAC control head and methods of making and using same have been provided. One skilled in the art will appreciate that the present invention can be practiced by other than the described embodiments, which are presented for purposes of illustration and not of limitation, and that the present invention is limited only by the claims which follow.

What is claimed is:

1. An HVAC control head, comprising:
a face plate having a flange and a skirt, wherein the skirt includes a plurality of openings and wherein the flange extends outwardly of the skirt to an outer contiguous edge;
a housing having a plurality of resilient tabs configured to interlock with the plurality of openings in the skirt, and first and second clips positioned at opposite ends of the housing, the first clip extending outwardly at an angle from a rearward end coupled to the housing to a forward, free end such that the free end of the first clip is spaced outwardly from the housing and juxtaposed near the outer edge of the flange when the resilient tabs are interlocked with the openings in the skirt;
a plurality of controls disposed in the HVAC control head such that a portion of each control projects through the face plate; and
a plurality of knobs each disposed on the portion of the control that projects through the face plate.

2. The HVAC control head of claim 1, wherein the clips are formed integrally with the housing.

3. The HVAC control head of claim 1, wherein the faceplate has a length and width of approximately 183 mm and 53 mm, respectively.

4. The HVAC control head of claim 1, wherein at least one of the plurality of controls is disposed from the housing.

5. The HVAC control head of claim 1, wherein at least one of the plurality of controls is disposed from a circuit board that is mounted in the housing.

6. The HVAC control head of claim 1, wherein at least one of the plurality of controls is disposed from the face plate.

7. The HVAC control head of claim 1, wherein the plurality of controls includes switches, buttons, and potentiometers.

8. A modular control unit comprising:
a body comprising:
a face plate having a portion defining a flange having an outer edge, the face plate defining a front of the control unit; and
a housing having a solid clip disposed at a first end of the housing such that a slot is formed between an end of the solid clip and a portion of the flange, and a resilient clip disposed at the other end of the housing, the resilient clip extending outwardly at an angle from a rearward end coupled to the housing to a forward, free end such that the free end of the resilient clip is spaced outwardly from the housing and adjacent the outer edge of the flange;
a plurality of controls disposed from the body such that they are operable from the front of the control head; and
a plurality of electrical connectors disposed from a rear surface of the housing.

9. The modular control unit of claim 8, further comprising a controller disposed within the control head and coupled to the plurality of controls and to the plurality of electrical connectors.

10. The modular control unit of claim 9, wherein the plurality of controls comprises controls for an automotive HVAC system.

11. The modular control unit of claim 10, wherein the controller is programmed to control the automotive HVAC system responsive to the plurality of controls.

12. The modular control unit of claim 10, wherein the plurality of controls includes at least two controls corresponding to at least two automotive HVAC systems and the controller is programmed to operate a selected HVAC control system responsive to the operation of a corresponding control.

13. The modular control unit of claim 10, further comprising an input signal indicating engine status, and wherein the plurality of controls include at least two controls corresponding to at least two automotive HVAC systems and the controller is programmed to operate a selected HVAC control system responsive to the engine status.

14. The modular control unit of claim 10, further comprising at least one control for other than an HVAC function.

15. The modular control unit of claim 14, wherein the function other than an HVAC function is an alarm clock.

16. The HVAC control head of claim 1, wherein the free end of the first clip includes a retaining interface for trapping a portion of an instrument panel between the first clip and the flange.

* * * * *